US012721330B2

(12) United States Patent
Musiani

(10) Patent No.: US 12,721,330 B2
(45) Date of Patent: Sep. 1, 2026

(54) ARTIFICIAL LURE FOR SPORT FISHING OF AN IMPROVED TYPE

(71) Applicant: Angelo Musiani, Lavis (IT)

(72) Inventor: Angelo Musiani, Lavis (IT)

( * ) Notice: Subject to any disclaimer, the term of this patent is extended or adjusted under 35 U.S.C. 154(b) by 0 days.

(21) Appl. No.: 19/066,639

(22) Filed: Feb. 28, 2025

(65) Prior Publication Data

US 2025/0212858 A1 Jul. 3, 2025

(51) Int. Cl.
*A01K 85/00* (2006.01)

(52) U.S. Cl.
CPC ...... *A01K 85/1897* (2022.02); *A01K 85/1811* (2022.02)

(58) Field of Classification Search
CPC ............................ A01K 85/1897; A01K 18/11
USPC ........................................................ 43/42.24
See application file for complete search history.

(56) References Cited

U.S. PATENT DOCUMENTS 2,738,610 A * 3/1956 Rice ...................... A01K 85/16 43/42.31
2,865,130 A * 12/1958 Accetta .................. A01K 85/00 D22/128
4,158,927 A * 6/1979 Capra .................. A01K 85/005 D22/127
6,317,949 B1 * 11/2001 Dotson .................. A01K 85/00 29/280
7,208,184 B2 4/2007 Chen
8,769,862 B2 * 7/2014 Blanchar ................ A01K 85/00 43/42.28
8,776,428 B2 * 7/2014 Langer .................. A01K 85/12 43/42.15
12,284,994 B2 * 4/2025 Bossone, III .......... A01K 85/10
2004/0018272 A1 1/2004 Chen
2005/0235550 A1 * 10/2005 Oelerich, Jr. .......... A01K 85/00 43/42.26
2007/0261289 A1 * 11/2007 Hobbins ................ A01K 85/00 43/42.24
2008/0072473 A1 * 3/2008 Hogan .................. A01K 91/04 43/42.24

* cited by examiner

*Primary Examiner* — Christopher P Ellis
(74) *Attorney, Agent, or Firm* — Gravis Law, PLLC; Stephen S. Zimowski

(57) ABSTRACT

The present Invention reveals an innovative artificial lure for sport fishing characterized by a peculiar layout such as to give it an extremely natural behavior in the water when suitably maneuvered by a fishing line, or when left in the water without being moved by the same line. The Invention also has technical devices such as to be used also in combination with baits already existing in the State of the Art, in order to increase the characteristics of priming for certain species of fish, especially for the Perch-Trout species.

10 Claims, 8 Drawing Sheets

[Fig. 1]
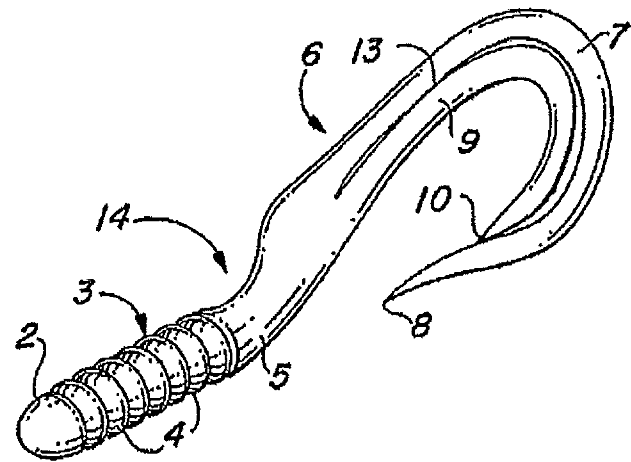
[Fig. 2]
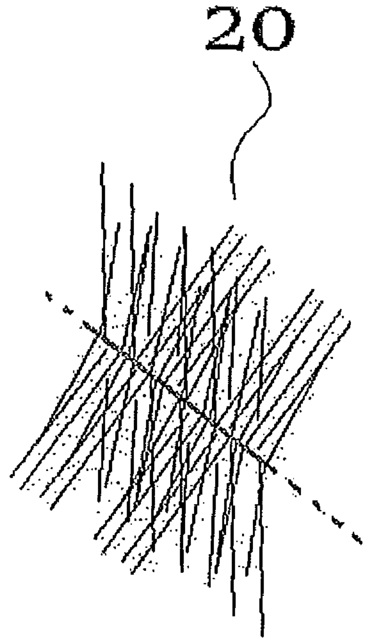

[Fig. 3]
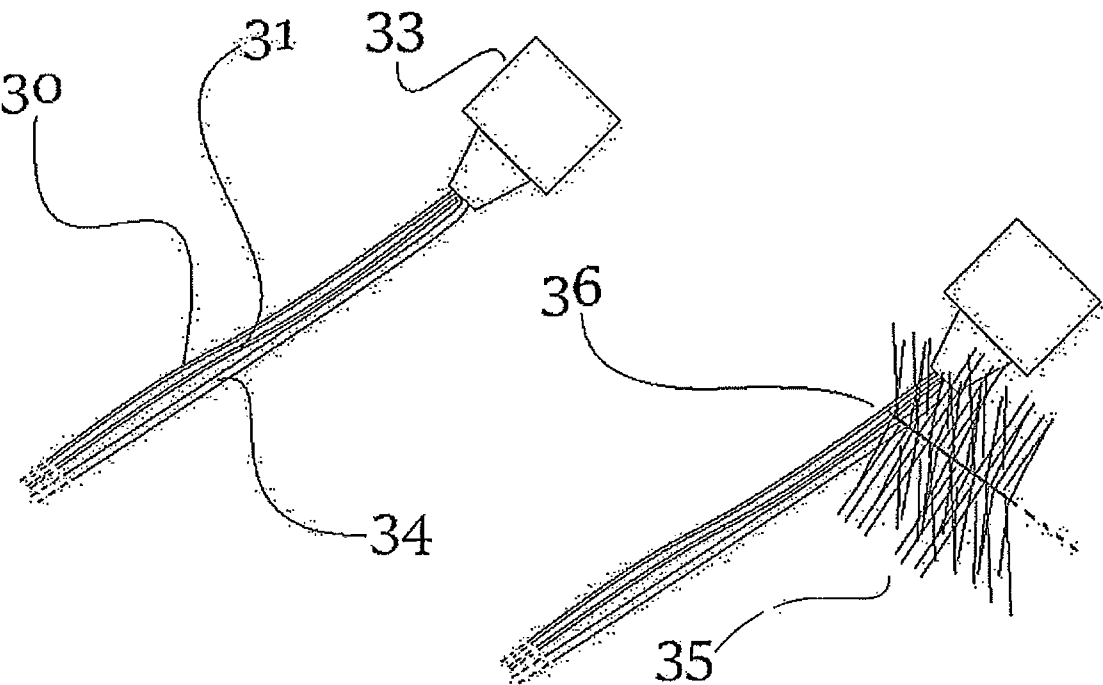
[Fig. 4]
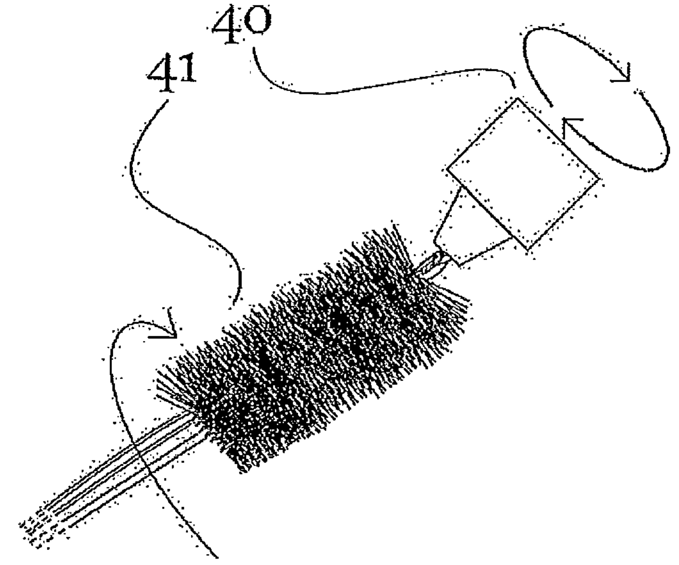

[Fig. 5]
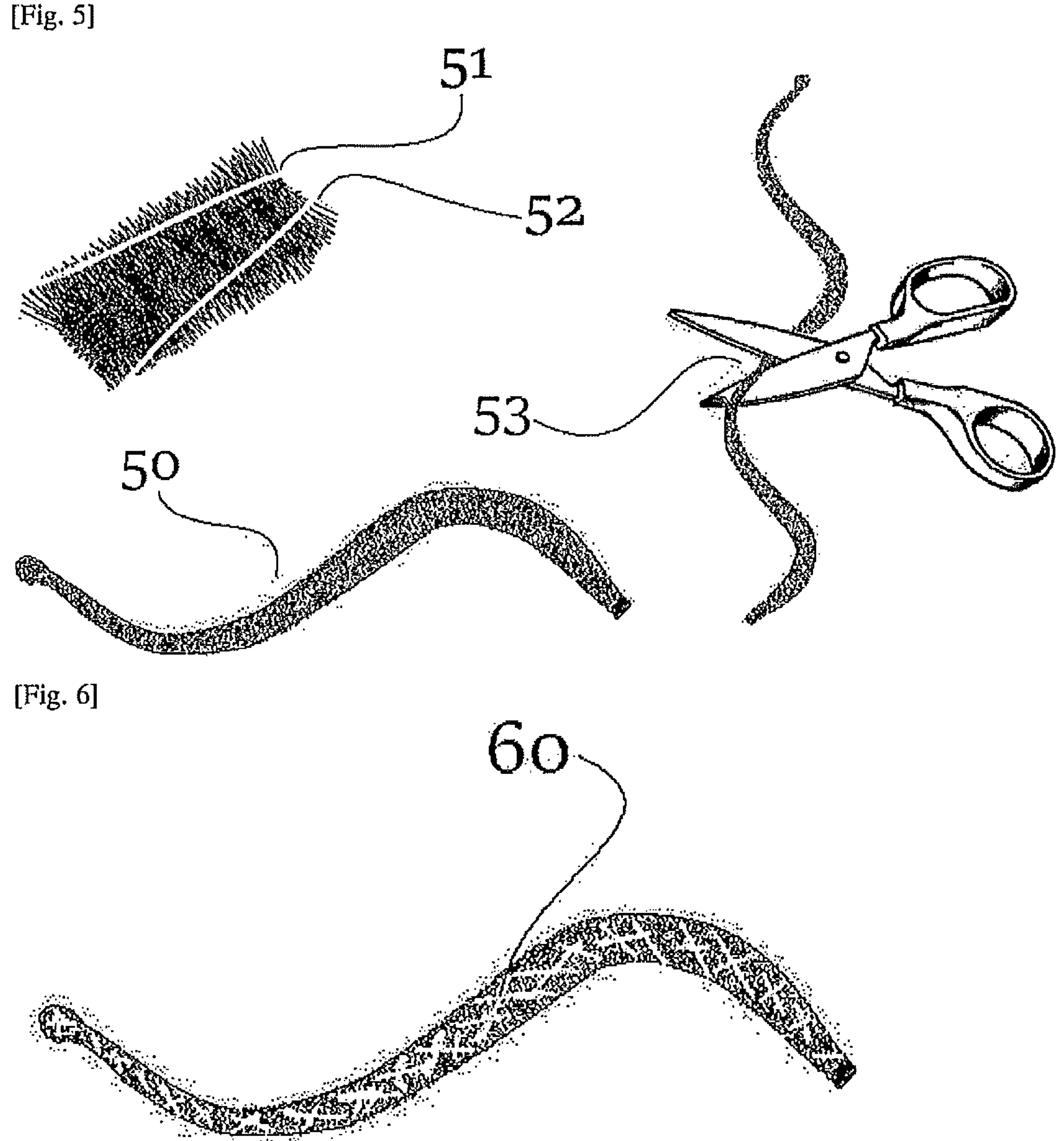
[Fig. 6]

[Fig. 7]
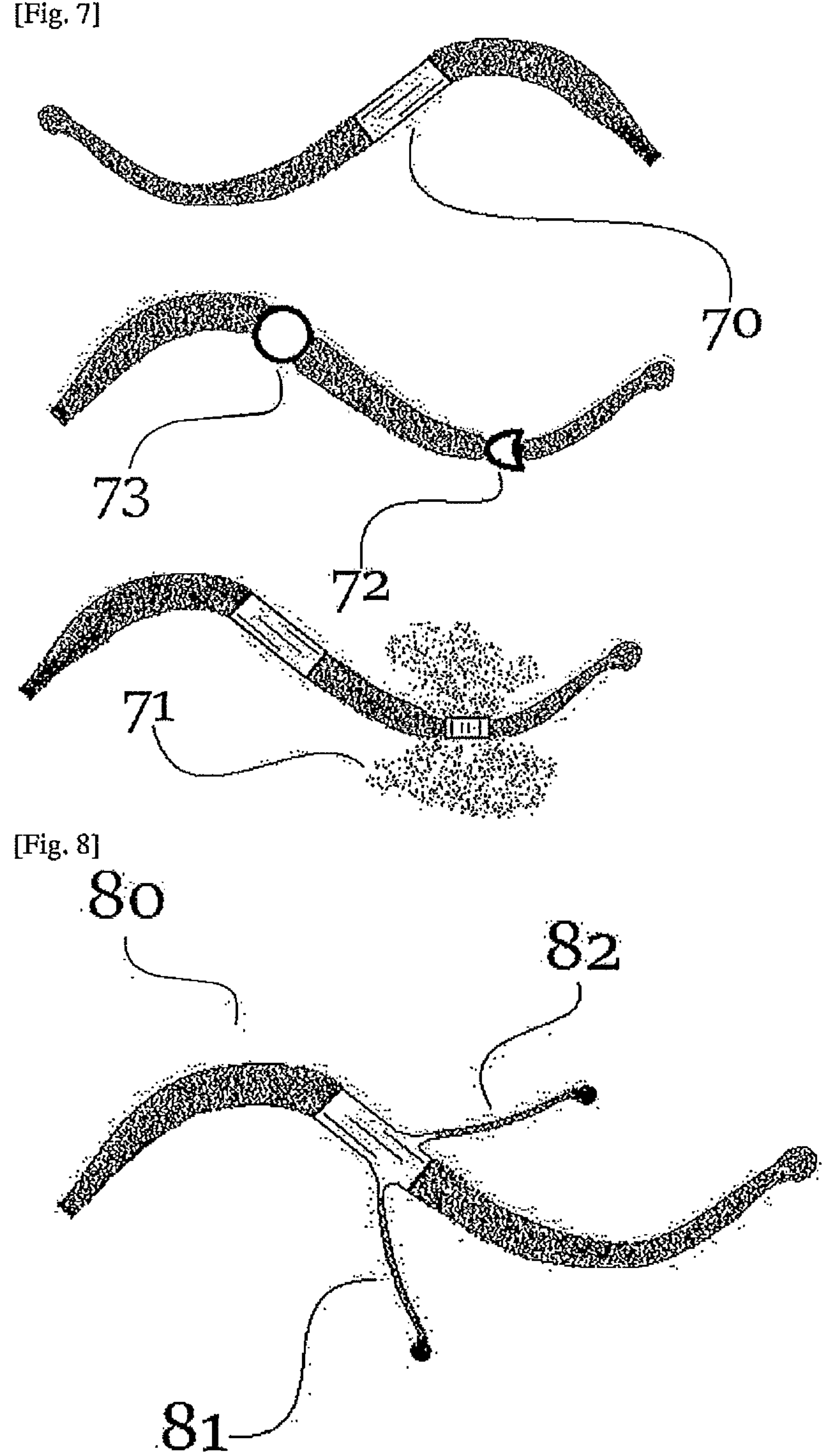
[Fig. 8]

[Fig. 9]
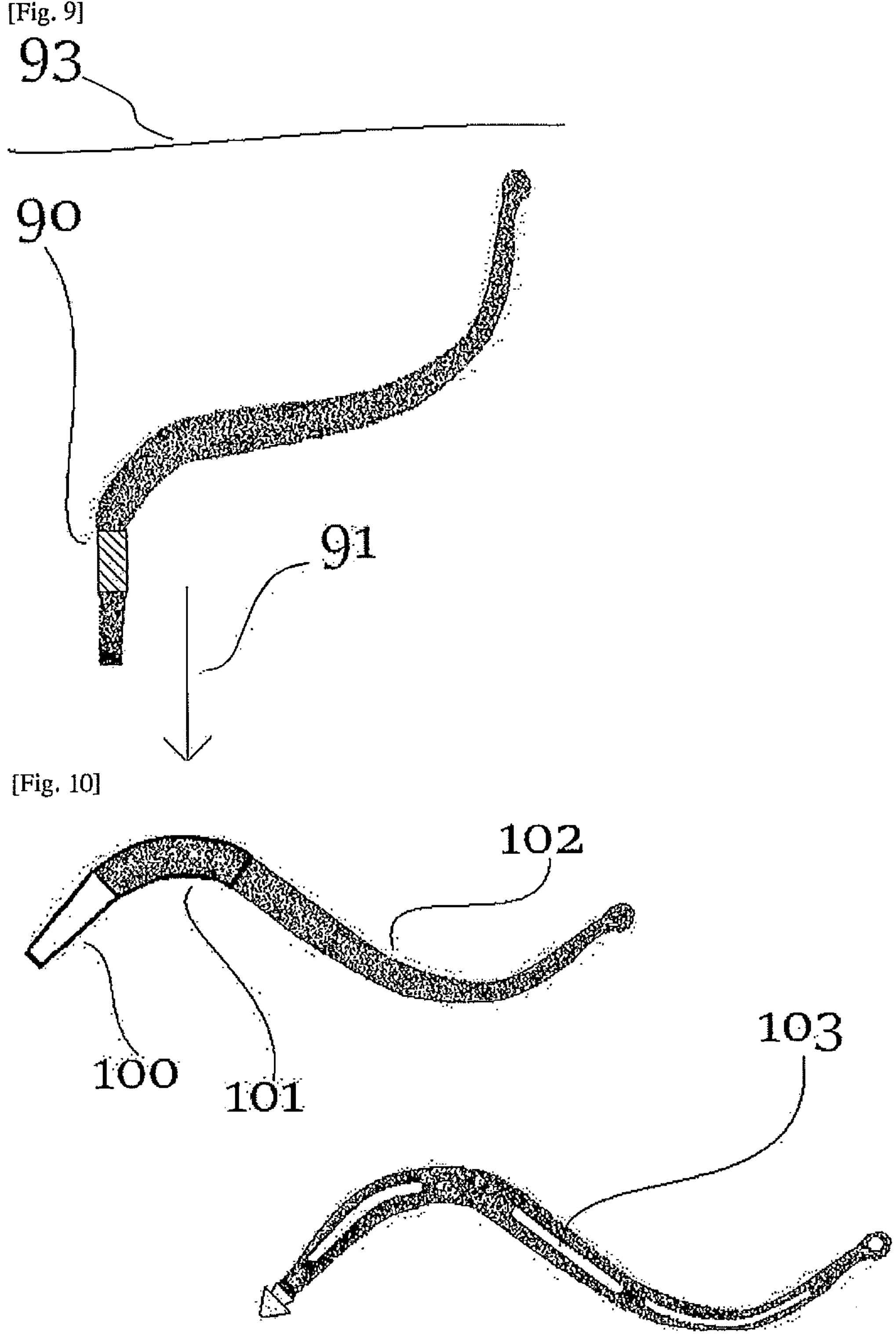
[Fig. 10]

[Fig. 11]
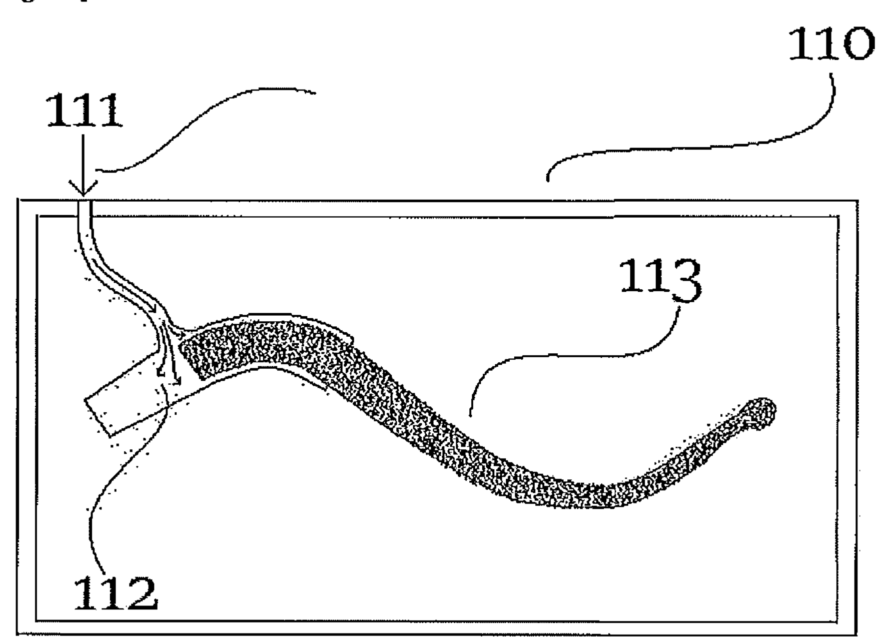
[Fig. 12]
120
124
121
123
122

[Fig. 13]
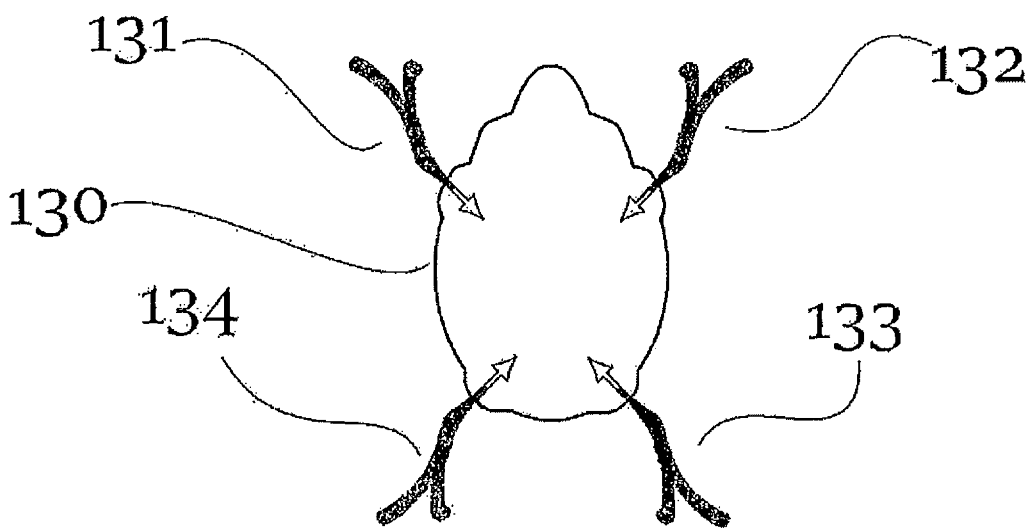
[Fig. 14]
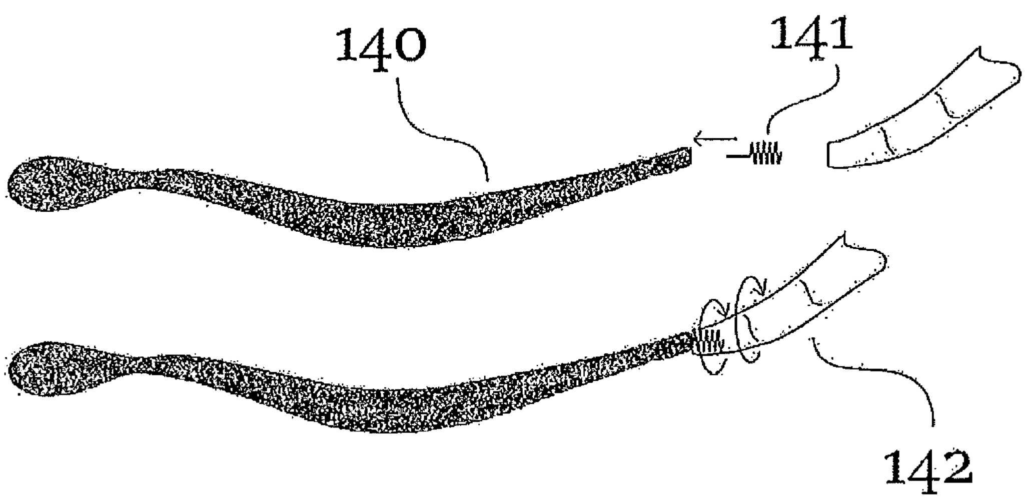

ARTIFICIAL LURE FOR SPORT FISHING OF AN IMPROVED TYPE

SCOPE OF THE INVENTION

The present Invention is revealed within the products used in the field of application of sport fishing, in this case in those artifacts that imitate the features and movements in water of the prey of certain types of fish fauna.

BACKGROUND OF THE INVENTION

Sport fishing is an activity exercised in the sea, lakes and rivers that is widespread throughout the world to such an extent that it creates a complex and articulated system of techniques, equipment, products and services from which high profits are generated and opportunities related to the management of the entire process.

An initial distinction between the various techniques and equipment used in sport fishing can be made on the basis of the natural setting in which it is exercised: on the one hand there is sport fishing at sea, also carried out with the aid of boats and equipment that are generally oversized (fishing rods, reels, lines, bait etc.) commensurate therefore with the considerable size of possible prey.

There is then the activity of sport fishing carried out in fresh water, both lakes and rivers, in which the morphological difference of the prey resulting from the diversity of the environment compared to that of the sea, leads to the use of a type of equipment that is on average lighter and more specific, also appropriately diversified in the various techniques of fish predation developed over decades of refinements.

All recreational fish predation techniques are adapted to the chosen environment, but again a further differentiation of these techniques can be made: on the one hand, there is natural bait fishing, in which the bait is represented by a living creature taken from the natural surroundings or the fish's predation environment—the water—on the other hand, there is artificial bait fishing.

Artificial bait fishing consists of the use of a bait constructed in imitation of the natural bait by means of materials and techniques often developed to enhance those characteristics that can stimulate the predatory instincts of fish fauna, selectively packaged for each type of fish.

A choice example of the wide diversification in bait construction is given by those referred to as "artificial flies" used in fly fishing technique, which are insect imitations built on the shank of a small fishing hook.

In fly-fishing, a peculiar and flexible casting rod is used to spread, first in the air and then in the water, a special heavy-weight line called a "rat-tail" whose front apex tapers progressively; this section of the rat-tail is then connected to a transparent nylon terminal on whose apex the artificial fly is knotted.

The artificial fly imitates a stage of evolution of a family of insects that in water express one or more life cycles, or a general insect or small animal that may inhabit near a lake or river. Such an insect is common prey for fish fauna which, not distinguishing the difference with a real insect, acts accordingly by preying on said bait.

Another area of freshwater sport fishing where there are multiple types of purpose-built lures is fishing for the fish species Trout Perch, also known as "Black Bass." The Trout Perch is a medium-sized, stocky fish found mainly in lake and pond waters without strong current. It is a much sought-after catch by fishermen all over the world because its capture is characterized by a thunderous attack of the bait, when this occurs on the surface of the water, and a brisk retrieval phase of the same by means of the fishing line and rod.

The diet of the Trout Perch includes insects, worms, fish, shrimp, leeches, small frogs and all kinds of life forms that inhabit the waters where it dwells; in general, it is aggressive with anything that interferes in its environment. This characteristic has led to the creation of a series of purely fancy artificial lures such as to stimulate its predatory instincts; in fact, it is not uncommon for an active Trout Perch to attack any object that falls into the water and disturbs the quiet of the natural environment.

Of course, the hunting activity of the Trout Perch is not limited on the surface of the water but also in its depths, depending on the temperature and season of the year, as well as the availability of food. Unlike many other fish, however, the behavior of the Perch Trout has remarkable traits of notable unpredictability, so in the arsenal of artificial lures of a sport fisherman it is necessary to provide for a wide diversification of the baits, in order to know how to interpret day after day the mutations of the predatory behavior of the aforementioned animal.

In U.S. Pat. No. 4,709,501—Publication U.S. Pat. No. 4,709,501A, a worm-shaped artificial lure, a typical lure for the Perch Trout, made of flexible synthetic material, is unveiled, endowed with a peculiar asymmetrical feature in all its different forms of construction (FIG. I—Prior Art). Said asymmetric characteristics generate, when the bait is retrieved from a line in the water, a series of movements and vibrations peculiar enough to be attractive to the fish fauna of the Perch Trout.

To date in the category of worm-shaped lures, or assimilated to them, there are myriad diversifications, all judged to be more or less capable of producing the predatory behavior of the Perch Trout. For example, the Japanese manufacturer YAMAMOTO (https://www.gary-yamamoto.com/products) offers a series of artificial lures for the Trout Perch in imitations of beings living in the water, all diversified by species (worms, shrimps, goiters, frogs etc.) of various sizes, colorations, and body proportion ratios.

Manufacturer YAMAMOTO also offers fancy artificial lures, equally attractive to the Trout Perch, of peculiar and extremely variable features (https://www.gary-yamamoto.com/products/gary/buzz-bait).

It is not only the shape of the lure that attracts the fish, during the retrieving action by means of the fishing line, but also the further phenomena related to it such as the vibrations in the water, the colors of the lure and even the olfactory scents released by it (if designed for that purpose) during its use in the water.

Further specialization of such lures is conferred by the physicality resulting from the material chosen for construction. These are usually silicone and/or thermoplastic substances, hence elastomers, characterized by softness and flexibility for the purpose of imitating not only the appearance but also the texture and movement in water of, for example, a large worm.

The worm-shaped artificial lure is definitely a lure of choice for sport fishing for Perch Trout: it is constructed using molds into which preheated chosen material is injected by extrusion. The molds inside them present a negative shape of the bait, in this case the worm, that is, a cavity reached by one or more channels into which said extruded material is injected.

Once cooled, the mold is opened and the worm subsequently extracted and finished by further processes. The bait must have a properly installed hook to which fishing line is attached; often the hook is added inside the mold as it is partially encased in one or more parts by the casting of the worm body.

The application of the hook to the body of the artificial lure may, however, be done retrospectively according to placement techniques of the angler's choice.

It is common usage to provide a series of additional products in the silicone and/or thermoplastic material to be injected, such as to characterize the lure with a peculiar visual effect in the water, for example of glitter or other aesthetic elements in the form of powder, grains or similar dispersions. Said decorative elements are then to be added to the formulation of the silicone and/or thermoplastic material before injection into the appropriate molds.

Similarly, large solid decorative effects can be incorporated into the body of the artificial lure, even such as to suitably modify the shape of said lure in order to trigger the predatory behavior of the Trout Perch.

With regard to the family of worm imitation artificial lures for the sport fishing of the Perch Trout, however, certain limitations arising from the technique and materials used in the production of said lures must be noted.

The family of silicone and/or thermoplastic materials is yes extremely broad and versatile however the worm, once made and customized, always has certain peculiarities not always desired by anglers.

Even by making a worm by means of a material with an extremely light specific weight, one cannot fail to notice that in water it presents a behavior quite different from that of a living being, even when properly worked by the movement imparted by the fishing line.

Small movements induced by the fishing line, in fact, do not correspond to harmonious and progressive movements in the body of the artificial lure, while vigorous movements of the line make the consequent behavior of the worm completely unnatural. Then, when the fishing line is almost motionless, the body of the worm made of silicone and/or thermoplastic material is devoid of those micro movements of parts of its body that are the hallmark of the vitality of the lure, i.e.: it is practically impossible to impart that minimal mobility to the worm such as to convince the predator that it is a living being.

A further undesirable peculiarity in the use of worm-shaped artificial baits made by means of silicone and/or thermoplastic materials is the fragility of this material when subjected to the attack of the Trout Perch, thus to its bite; this fish species, as is widely known, has an extremely robust and powerful mouthparts.

The result of an attack by the Trout Perch on an artificial bait made of the above materials is, oftentimes, its partial destruction or strong deterioration, and in some cases its complete destruction. There is no doubt, therefore, that a day's fishing is likely to involve a considerable economic expenditure for the angler in replacing, as soon as possible, all those artificial lures partially or completely destroyed by the bite of the Perch Trout.

It is important to emphasize that partial damage to the artificial lure is not only an aesthetic damage, as it is reflected in the difficulty, during its reuse, both in making the lure move appropriately by the pulling of the fishing line and in proposing to the fish a congruous and acceptable silhouette of the lure; in practice, the attractive elements of the lure are lost due to the damage occurred, elements that although aesthetic are part of the technical functionality of the lure.

Attempts to repair an artificial lure made of silicone and/or thermoplastic material are virtually useless, as the loss of the structural integrity of the lure body is an event for which there is no remedy. Even the practice of reconnecting in a sort of "collage" multiple fragments of artificial lures by means of metal pins or wire clips does not lead to any really appreciable results.

There is also an additional undesirable aspect in the use of silicone and/or thermoplastic type lures: as disclosed earlier in the text of this Invention, it is customary to impart a peculiar olfactory characteristic to the lures by the use of special substances. Fragrances are commercially available with which it is possible to "anoint" artificial baits made of silicone and/or thermoplastic material for the purpose of increasing their attractiveness to fish.

It is easy to guess, however, that in contact with water such substances separate, more or less easily, from the body of the same artificial bait or are heavily diluted in a very short time, drastically decreasing their effectiveness, this is because the body of the bait made of silicone and/or thermoplastic material is waterproof.

There are commercially available artificial baits made of silicone and/or thermoplastic material in which the odorous fragrances are integrated into the same material during the construction process, thus allowing them to obviate their leaching; however, it should be noted that in these baits it is not possible to modify and update these odorous characteristics since they cannot be separated from the body of the bait.

For the purpose of overcoming the technical limitations as pointed out above of artificial lures made of only silicone and/or thermoplastic material, the present Invention describes a novel layout of an artificial lure, herein disclosed in the convenient and appropriate form of a worm.

SUMMARY OF THE INVENTION

The Invention describes the construction process and final characteristics of an artificial lure for sport fishing whose outward appearance is similar to that of a worm, of various sizes and with multiple possible layouts. The final shape of the lure so designed can also vary, in order to imitate the shape of another animal preyed upon by fish. The bait resulting from the idea of the Invention is made from a material belonging to the family of Technofibers—such as Rayon, Viscose, Acrylic, Nylon etc. i.e. the set of synthetic fibers and man-made fibers, but also available from natural precursors such as Cotton—processed from an initial form of yarn by means of an appropriate and peculiar technique. This construction process is completed by accentuating, in the finished product, certain physical-mechanical characteristics devoted to the field of application of artificial lures for sport fishing; said characteristics not obtainable by the exclusive use of plastic and/or silicone materials already known in the State of the Art.

Advantageous Effects of Invention

The Finding resulting from the idea of the Invention, namely the worm-shaped artificial lure, is characterized by the following advantages:

a. it has a characteristic mobility in water that cannot be reproduced by silicone and/or thermoplastic materials, both in the presence of traction by the fishing line and in the absence of such traction,
b. is not damaged by fish attack and bite, unlike lures made of silicone and/or thermoplastic materials,
c. is arranged for the retention of applicable odor essences post-production, such as to allow prolonged release of the same into the water more effectively than those made of silicone and/or thermoplastic materials, also allowing the possibility of removing and re-applying said essences from the body of the worm in a repeatable and continuous manner. This feature is both native as a result of the materials and production technique of the artificial lure and because the possibility of retaining and releasing scent essences is integrated with technical solutions to meet this need, d. the materials of which the artificial bait is made can advantageously be integrated with synthetic materials from recycling, either to change the buoyancy characteristics of the same bait, or to reintroduce into the production cycle substances that would otherwise be disposed of by incineration, e. can be supplemented with silicone and/or thermoplastic materials for the purpose of partially modifying its behavior in water, f. may be attached to the body of a bait made of silicone and/or thermoplastic materials for the purpose of modifying and improving, on the whole, its characteristics devoted to triggering the fish's predatory instinct, g. can be used for the purpose of repairing lures made of silicone and/or thermoplastic material damaged by the attack and bite of a fish, h. is considerably stronger than an artificial completely constructed of silicone and/or thermoplastic material; this allows greater certainty of recovery of all its parts, thus contributing to the release of less pollutant material into the environment, i. has a significantly lower weight than State of the Art artificial lures.

BRIEF DESCRIPTION OF THE DRAWINGS

The Drawings table is integrated into the documentation of this application for the purpose of exemplifying the features of the Finding, including highlighting variations in the application described therein; in this case it reveals:

FIG. 1 in which Prior Art U.S. Pat. No. 4,709,501A is shown, i.e., a worm-shaped sport fishing lure already known in the State of the Art, FIG. 2 in which the shape of Technofibers used for the construction of the worm-shaped artificial lure according to the idea of the Invention is shown, FIG. 3 in which a first step of the procedure of constructing the worm-shaped artificial lure according to the idea of the Invention is shown, FIG. 4 in which a further step of the procedure of constructing the worm-shaped artificial lure according to the idea of the Invention is shown, FIG. 5 in which is shown the worm-shaped artificial lure obtained from the construction process according to the idea of the Invention, by the further process of shaping by cutting Tecnofibers, FIG. 6 in which an aesthetic variant of the worm-shaped artificial lure obtained by the construction process according to the idea of the Invention is shown, FIG. 7 in which is shown a device, applied to the worm-shaped artificial lure obtained by the construction process according to the idea of the Invention, for improving its performance in water, FIG. 8 in which a further device, applied to the worm-shaped artificial lure obtained by the construction process according to the idea of the Invention, for the improvement of its performance in water is shown, FIG. 9 in which a device, applied to the worm-shaped artificial lure obtained by the construction process according to the idea of the Invention, for the modification of its buoyancy characteristics in water is shown, FIG. 10 in which is shown the worm-shaped artificial lure obtained by the integration of a manufacturing process by mold and injection and/or casting of silicone and/or thermoplastic material resulting from the idea of the present Invention, FIG. 11 showing a semi-mold used for the integration of the production process by injection and/or casting of silicone and/or thermoplastic material resulting from the idea of the present Invention, FIG. 12 in which is shown the docking device applied to the worm-shaped artificial lure that is the result of the idea of the present Invention, FIG. 13 in which is shown an artificial lure made of silicone and/thermoplastic material already known in the State of the Art to which the Finding from the idea of the present Invention is applied, FIG. 14 in which is shown a piercing spring hooking device applied to the worm-shaped artificial lure that is the result of the idea of the present Invention, FIG. 15 in which is shown a hollow screw hooking device applied to the worm-shaped artificial lure that is the brainchild of the present Invention, FIG. 16 in which the lure of the present Invention is integrated by injection into a mold in the body of an artificial lure made of silicone and/or thermoplastic material.

DETAILED DESCRIPTION OF THE INVENTION

The description of the various forms of embodiment of this Invention is disclosed herein for illustrative purposes and is not intended to be wholly exhaustive or limited to the form of embodiment described herein.

All possible modifications of an obvious nature of the Invention and its scope put in place by persons skilled in the art do not therefore limit the terms of protection of the License itself.

According to the form of embodiment of the Invention the artificial lure—i.e., the worm—is made from a base material consisting of the family of Technofibers i.e., the set of artificial fibers and/or synthetic fibers, such as, for example, Rayon, Viscose, Acrylic, Nylon and other similar substances, preferably Textured Nylon, however, it is also possible to use natural material, such as, for example, Cotton. Such basic materials are chosen in the form of thin fibers for further processing resulting from the idea of the Invention, partly derived from the construction processes of Chenille.

According to the idea of the Invention to the textured Nylon may be added a yarn consisting of a Polyester sliver; said yarn is characteristic for creating a reflective color effect for light that attracts the attention of fish fauna.

According to the idea of the Invention, Technofibers can also originate from the recycling of plastic materials which, having different physical characteristics, can advantageously modify the buoyancy or sinking performance of the artificial bait—i.e., the worm. By appropriately interweaving such fibers, it is possible to:

a. make the entire artificial lure more or less buoyant, b. make a single part of the lure more or less buoyant than the whole of its body, thus introducing a peculiar element in the water behavior of the same.

In addition, according to the idea of the Invention, the recycling of such plastics avoids their release into the environment, or their incineration in waste-to-energy plants, thus reducing the share of virgin material required by industry.

Technofibers are selected according to a wide range of colors, shapes, textures, characteristics such as flexibility, water repellency, density, and further specifications that will be migrated into the artificial bait obtained according to the process of making the present Invention—namely, the worm.

According to the form of embodiment of the Invention the Technofibers, preferably textured Nylon, are encased in two or more support yarns (30)(31), i.e., mostly synthetic yarns preferably made of twisted Nylon, which represent the inner core of the artificial lure and which are developed along an axial direction, juxtaposed with each other in a parallel manner, thus representing its axis of symmetry. One or more welding yarns are added to the support yarns (34); mutually coupled to the support yarns and parallel to them, the latter being constructed of a heat-soluble material, i.e., a substance that upon exceeding a temperature threshold of 80/90 C.° melts and then solidifies upon descending from the said temperature threshold.

According to the embodiment form of the Invention, the supporting and welding yarns, which represent the central core of the artificial lure, are joined together at a common apex and hooked to a rotating mandrel (33). The segments of the Technofibers (35) are added orthogonally (36) to the support yarns and heat-soluble yarns due to the rotation of them imparted by the spindle (40), which causes them to coil (41) along the axial direction, thereby locking the Technofibers interwoven with them.

According to the form of embodiment of the Invention by the effect of the winding impressed by the rotation of the spindle on the supporting yarns and welding yarns to which the Technofibers are progressively attached, the creation of the cylindrical body of the artificial lure takes place. Appropriately, this machining process makes it possible to effectively recreate the semblance and appearance of a worm, as a shape resembling a thin supple cylinder with a large development in length is created.

According to the form of embodiment of the Invention the mixture of different types of Tecnofibres segments, each endowed with unique chromatic and technical peculiarities, defines both the final outward appearance of the artificial lure—i.e., the worm—and its further characteristics that are desired to be reflected in the fishing action, by way of example the flexibility and reaction of the lure to the movements impressed by the fishing line. In (60), an aesthetic effect represented by the striations obtained through the use of materials of different colorations can be seen.

According to the form of embodiment of the Invention once the process of constructing the body of the artificial lure—namely, the worm—has been exhausted, a thermal process is used which allows the welding yarn incorporated in the supporting yarns to stably lock the Technofibers to them, since said thermal process will melt its thermo-soluble material which will adhere both to the supporting yarns and to the portion of Technofibers with which it is in contact. Once the thermo-soluble material has solidified, all the constituents of the body of the artificial bait—that is, the worm—will be mutually welded together.

This process will enable the body of the artificial lure—i.e., the worm—to withstand any mechanical stress; in addition, this welding process allows the cross-cutting of the threads supporting the body of the artificial lure—i.e., the worm—to the length deemed appropriate.

According to the form of embodiment of the Invention during the process of attaching the Technofibers to the supporting yarn, the diameter of the body of the artificial lure—i.e., the worm—is appropriately shaped by cutting the Technofiber segments (51)(52). Such an innovative shaping process by cutting Tecnofibers occurs continuously and geometrically variable during lure making, changing the parameters of the cut, and is indispensable to avoid the making of artificial lures of shape not congruous with the required scope and use.

The process of shaping by cutting varies according to the need to recreate the external appearance of the lure, i.e., following the variation of the diameter of the section of the natural lure to be imitated—i.e., the worm—or other chosen shape, respecting the due proportions (50). The peculiarity of the shaping process by cutting derives from the continuously variable profile of the cut, resulting from a variable width of the rotating blades controlled by the profile of a rotating cam. At the end of the shaping by cutting process, the artificial lure—that is, the worm—is severed at the appropriate length (53).

Due to the fixation obtained by the liquefied welding wire, the cutting of the yarns and Technofibers (53) does not allow the unraveling of the artificial lure—that is, the worm—because all of its constituent elements are adhered to each other.

The process of making the artificial lure—i.e., the worm—causes said lure to exhibit technical characteristics that are very different from similar artificial lures made of silicone and/or thermoplastic materials already widespread in the State of the Art: the obvious lightness, given by the minimal weight of the Tecnofibers and the synthetic yarn core, gives the worm a mobility in the water of an improved and innovative type: in primis in the absence of traction by the fishing line the worm will have a micro-mobility due to the movement of the water since it is extremely light and flexible, imitating the appearance and behavior of a natural worm; in secundis any small traction of the fishing line exerted to impart a movement to the artificial lure will result in a consequent behavior according to a scale of sensitivity greater than a worm imitation obtained by means of silicone and/or thermoplastic materials, this due to the effect of the lower inertial mass of the Trouble Finding resulting from the present Invention.

According to the form of embodiment of the Invention, the artificial lure thus obtained—i.e., the worm—is thus endowed with a response to the movements impressed by the fishing rod by means of the fishing line with a more accurate scale of sensitivity which allows a greater resolution thereof: this is reflected in the possibility on the part of the fisherman to take advantage of a dynamic of the range of movements of the artificial lure, in order to adapt the same to the contingent situations of the fishing environment and its sudden variations.

According to the form of embodiment of the Invention the extreme mobility in water of the artificial lure thus obtained—namely, the worm—is to be further perfected by the application on the artificial lure of peculiar shaping elements.

According to the form of embodiment of the Invention such shaping elements consist of cylindrical (70) or spherical shaped tubes, or spheroids (72)(73), and have a variable size but always shorter length than that of the artificial lure. Such elements are drilled internally and the diameter of this opening is smaller than the sections of the artificial lure to which they are applied. They are constructed by the use of different materials according to the function they serve, i.e., alternating:

i. an absorbent material suitable for the retention of aromatic substances,
ii. a non-absorbent material, synthetic or natural type,
iii. a metallic material.

Said modeling elements constructed from the three variations of materials are added to the body of the worm by concentric insertion (70)(72)(73).

The purposes of using the modeling elements are mainly two a. when inserted onto the body of the worm they change its mobility by stiffening isolated parts of the same artificial lure, which will respond differently to mechanical stimulation from the water and/or fishing line,
b. when made from processes and/or materials that give them a characteristic of absorbency to aromatic substances, they can undergo a process of imbibition with specific products, the objective of which is to release an odorous trail in the water such as to attract the attention of fish fauna in order to trigger their predatory behavior. The patterning elements thus act as a slower-release reservoir in water, when compared to that in silicone and/or thermoplastic baits, of the aforementioned chemicals (71).

According to the form of embodiment of the Invention the multiple possibilities of including "n" shaping elements for modifying the in-water movements of the artificial bait—namely, the worm—and "n" shaping elements designed for the release of chemicals confers versatility to the same improved type bait and increased effectiveness for the purpose of catching fish fauna, particularly for those identified by the freshwater species as "Perch Trout" or "Black Bass."

According to the form of embodiment of the Invention, the shaping elements inserted concentrically to the body of the artificial lure—i.e., the worm—can further be arranged with mechanical hooks of various types to suitably change the shape of said worm into another shape, such as to improve the fishing action, i.e., the luring characteristic towards fish fauna. In (80) can be seen a worm in which a shaping element is in the shape of a small tube and placed in the front/middle area of the body; in the said shaping element are arranged two movable inserts (81)(82), for example also constructed according to the process of realization disclosed in the present Invention.

According to the embodiment form of the Invention, the shaping elements can also be made of such materials (90) as to change the buoyancy/sinking characteristics in water (93) of the artificial lure—i.e., the worm when applied to it (91). This makes it possible to thus vary the depth in water of the fishing action, adapting the behavior of the lure to the actual hunting setting of the fish fauna.

According to a further form of embodiment of the Invention, in order to devise an artificial bait—namely, the worm—in which all those aesthetic elements can be integrated that can guarantee excellent fishing results, a process of construction of the said artificial bait by means of molding and injection and/or casting of silicone and/or thermoplastic materials is also devised, in which in the said mold the body of the worm comes to be positioned in its cavity, thus allowing it to integrate with the additional silicone and/or thermoplastic elements.

In FIG. 10, the artificial lure of the present Invention—namely, the worm—consists of a partial section in the front area of the body made of transparent silicone (100), a middle part of the body in which transparent silicone externally covers the artificial lure (101), and a final part in which transparent silicone is not present (102). In (103) an example is revealed in which the silicone and/or thermoplastic material inserts are median to the body of the worm and continue along its axial development.

Figures 15, 16:
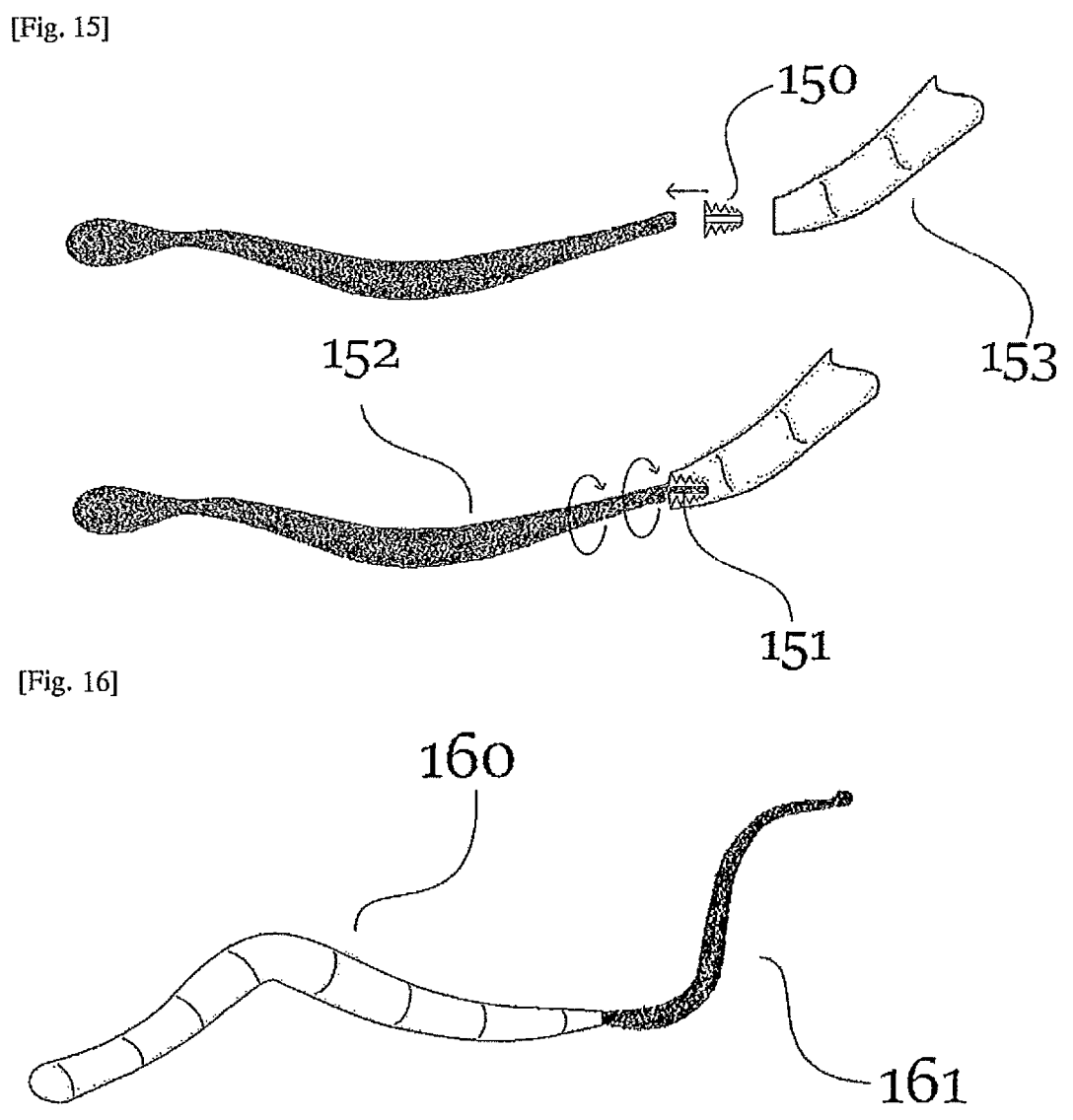

In FIG. 16, the artificial lure of the present Invention (161) is integrated by injection into the mold in the body of an artificial lure made of silicone and/or thermoplastic material (160) such that together it constitutes an improved type of sport fishing lure.

FIG. 11 unveils the half-shell of the mold (110) for injection and/or casting designed for making the artificial lure—i.e., the worm—of the depiction in FIG. 10 (100)(101)(102). The portion of the worm body (113), the volumetry that accommodates the silicone and/or thermoplastic material (112) with the associated feed line of the same material by injection (111) is highlighted.

According to the form of embodiment of the Invention, it is also possible to completely coat the body of the artificial lure—i.e., the worm—with the appropriate silicone and/or thermoplastic material depending on the type of lure to be made. The lure resulting from such a process will always be characterized by a mobility and behavior in water better than the State of the Art, since inside it remains the body obtained according to the realization process disclosed by the present Invention, thus reducing the inertial mass of the artificial lure.

It is also well known that the use of artificial lures constructed entirely of a silicone and/or thermoplastic material is affected by a general problem of robustness. The bite of a fish with a powerful mouth, such as the Trout Perch, often causes structural damage to the said lure, especially when it is characterized by a physicality that is itself fragile, such as the slender and elongated shape of a worm.

According to the form of embodiment of the Invention, the worm-shaped lure is endowed with much improved inherent strength compared to the totality of other lures made of silicone and/or thermoplastic materials; this is due to the fact that its constituent materials are particularly resilient as they are used for the construction of high tenacity fabrics and ropes. Damage inflicted on an artificial lure during a fishing session may likewise come from its stranding in underwater vegetation, from tree branches and submerged obstacles, or from the vegetation surrounding the fishing site in the case of an erroneous casting of the lure.

According to the form of embodiment of the Invention, it is possible to use the artificial lure—i.e., the worm—to repair and/or supplement artificial lures already known to the State of the Art constructed of silicone and/or thermoplastic material. This is possible by arranging the worm with a unidirectional mechanical plug attachment, constructed of plastic or metal material, such that an additional artificial lure is connected by drilling into the silicone and/or thermoplastic body.

In FIG. 12 it is possible to observe the pin joint element (120) connected to the artificial lure that is the fruit of the present Invention—namely, the worm (121). A silicone artificial lure (122) previously severed in its posterior portion because it was damaged is regenerated by the insertion of the worm made according to the idea of the Invention. Also visible is a coupling by means of a spring (124), also having a variable diameter, at the ends of which both the bait of the State of the Art made of silicone and/or thermoplastic material and the artificial lure of the present Invention—namely, the worm (123)—are hooked.

According to the embodiment form of the Invention, additional techniques for connecting the artificial lure—namely, the worm—to a lure of the State of the Art made of silicone and/or thermoplastic material can be used; in FIG. 14, one end of a perforating spring (141) is attached to the artificial lure of the Invention (140) by tying or other similar technique. The other end of the piercing spring, through a suitable movement, comes to pierce the body of the artificial lure made of silicone and/or thermoplastic material (142) for the purpose of penetrating it inside the latter, thus ensuring its connection.

Another connection technique is revealed in FIG. 15 by the use of a hollow screw (150). The artificial lure of the present Invention (152)—that is, the worm—is pushed inside the hollow screw (151), so as to secure itself to it. By means of a rotation of the hollow screw, and thus of the artificial lure of the present Invention—that is, the worm—it is then possible to pierce the body of the artificial lure made of silicone and/or thermoplastic material (153) in order to create the necessary connection.

According to the embodiment form of the Invention the artificial lure disclosed herein can also be employed to improve the characteristics of a pre-existing artificial lure in the State of the Art: for example in FIG. 13 the top view of an artificial lure in imitation of a tree frog (130) obtained from silicone and/or thermoplastic materials; said lure is provided with hind and fore legs made according to the process of the present Invention (131)(132)(133)(134); thus, the limbs come to be characterized by mobility and resistance to use of an improved type compared to silicone and/or thermoplastic materials. Such a modification may also be necessitated by partial destruction of the limbs due to long use of the bait, damage occurring due to the biting of a fish, or the need to impart improved characteristics to the same by means of the Found Fruit of the present Invention.

According to the form of embodiment of the Invention, it is also possible that the silicone and/or thermoplastic material used for making those particulars integrating the artificial lure—i.e., the worm—may also be chosen from the family of non-thermoplastic cross-linkable polymers, for example EVA (Ethylene Vinyl Acetate) or other peculiar materials, such as metals, for example.

According to the embodiment form of the Invention, it is also possible to create fancy lures, again by means of the materials and process disclosed in the present Invention.

According to another form of embodiment of the Invention, it is also possible to create artificial lures using yarns of natural origin in place of Technofibers.

EXAMPLES OF THE INVENTION

The Finding of the present Invention, i.e., the artificial bait, is mainly made with a shape in imitation of a worm, i.e., a bait of choice for catching the fish species of Perch Trout. However, it is possible to make different shapes, for example:

a. Leeches, b. Shrimps, c. Fish, d. Fancy shapes.

The construction process, in this case, will vary slightly for obtaining the desired shape of the lure, while retaining the basic construction technique disclosed in this Invention.

INDUSTRIAL APPLICABILITY

The industrial applications of the Finding resulting from the present Invention are inherent to the field of application of sport fishing, specifically the making and use of artificial lures. The technique of construction and the product thus obtained allows an application of an improved and perfected type without upsetting the techniques of catching fish already acquired in this peculiar field of application by anglers.

CITATION LIST

Citation List follows: no citations.

Patent Literature

PTL 1: U.S. Pat. No. 4,709,501A

No Patent Literature

NPTL1: https://www.gary-yamamoto.com/products

NPTL2: https://www.gary-yamamoto.com/products/gary/buzz-bait

What is claimed is:

1. An artificial lure for sport fishing, constructed by mechanical and thermal processes, preferably elongated and cylindrical in shape to imitate a living worm, comprising:

a. a central core, made from two or more synthetic support yarns, placed in contact with each other and parallel to each other, to which one or more welding yarns are added in contact with the synthetic support yarns and parallel to them, said welding yarns consist of a thermos-soluble material capable of liquefying when rising above a temperature threshold of around 80° C. to 90° C., and returning to a solid state below the same threshold, b. a multitude of Techno-Fibers segments, consisting of artificial fibers and/or synthetic ones, preferably comprising textured Nylon, with also variable colouring, connected to the support yarns and welding yarns by means of a mechanical grip resulting from the winding of the same, c. one or more modelling elements of spherical, spheroidal, or cylindrical shape with a perforation for insertion concentric to the body of the artificial lure, said modelling elements characterized by a length always shorter than the length of the artificial lure, with a perforation diameter smaller than the section of the artificial lure to which they are applied, and constructed using one or more of:

i. an absorbent material suitable for the retention of aromatic substances, ii. a non-absorbent material, synthetic or natural, iii. a metallic material.

2. The artificial lure of claim 1, in which to the Techno-Fibers, preferably comprising textured Nylon, is added a yarn consisting of a Polyester flat.

3. The artificial lure of the claim 1, in which to the Techno-Fibers are added a portion of Techno-Fibre derived from recycled plastics affect a difference in buoyancy of one or more sections of the artificial lure.

4. A process for manufacturing the artificial lure of claim 1 in which:

a. the support yarns and the welding yarns, placed in contact with each other, are joined at a common vertex and connected to a rotating spindle, b. the support yarns and the welding yarns are placed in contact with the Techno-Fibers segments, c. the rotating spindle is placed in rotation so that the twisting of the support yarns and the welding yarns engulfs and fixes the Techno-Fibers along an orthogonal direction, d. a cutting process is applied to the Techno-Fibers fixed on the support yarns and the welding yarns along their axial development, said cutting process operating to determine the final shape of the body of the artificial lure along its axial development, e. the artificial lure is heated to liquefy the welding yarns at which time the support yarns incorporate the Techno-Fibers, f. the artificial lure is cooled until the welding yarns solidify, g. the artificial lure is cut into the appropriate length, and h. the body of the artificial lure is inserted inside one or more modelling elements in a concentric manner.

5. The process of claim 4, in which:

a. the artificial lure is inserted inside a mould, b. an injection and/or casting process that covers the body of the artificial lure, at least partially, with suitably heated and liquefied silicone and/or thermoplastic substances, c. the mould is cooled and the artificial lure is extracted.

6. The artificial lure of claim 1, in which the modelling elements include at least one mechanical joint.

7. The artificial lure of claim 1, in which the modelling elements generate a buoyancy property when the artificial lure is under water.

8. The artificial lure of the claim 1, further comprising an outer shell comprising silicone and/or thermoplastic substances.

9. The artificial lure of claim 1, in which at one end is applied a coupling consisting of a mechanical joint using one or more of:

a. a mechanical pin, b. a spring with a variable diameter, c. a perforating spring, d. a hollow screw.

10. The artificial lure of claim 1, comprising natural fibers and characterized by a shape not attributable to a natural lure.

* * * * *